United States Patent
Whipple

(10) Patent No.: US 11,581,550 B1
(45) Date of Patent: Feb. 14, 2023

(54) METHOD AND SYSTEM FOR PROVIDING AN IMPROVED FITTING FOR A FLEXIBLE FUEL CELL

(71) Applicant: ROBERTSON FUEL SYSTEMS, LLC, Tempe, AZ (US)

(72) Inventor: Matthew Whipple, Tempe, AZ (US)

(73) Assignee: ROBERTSON FUEL SYSTEMS, L.L.C., Tempe, AZ (US)

( * ) Notice: Subject to any disclaimer, the term of this patent is extended or adjusted under 35 U.S.C. 154(b) by 0 days.

(21) Appl. No.: 17/528,499

(22) Filed: Nov. 17, 2021

Related U.S. Application Data

(60) Provisional application No. 63/114,587, filed on Nov. 17, 2020.

(51) Int. Cl.
*H01M 8/00* (2016.01)

(52) U.S. Cl.
CPC ........ *H01M 8/004* (2013.01); *H01M 2250/20* (2013.01)

(58) Field of Classification Search
CPC .................................................. H01M 8/004
See application file for complete search history.

(56) References Cited

U.S. PATENT DOCUMENTS

| | | | |
|---|---|---|---|
| 2,441,009 A | 5/1948 | Cunningham | |
| 3,537,732 A | 11/1970 | Cook | |
| 2010/0047665 A1* | 2/2010 | Takeshita | B60L 58/30 429/515 |
| 2018/0297461 A1* | 10/2018 | Tam | B60L 50/72 |
| 2020/0067108 A1* | 2/2020 | Yoshitomi | H01M 8/249 |
| 2020/0130517 A1* | 4/2020 | Akiyama | H01M 8/2475 |

FOREIGN PATENT DOCUMENTS

WO WO-2012150174 A1 * 11/2012 .......... H01M 8/2475

* cited by examiner

*Primary Examiner* — Brian R Ohara
(74) *Attorney, Agent, or Firm* — Smith Tempel; Steven P. Wigmore

(57) ABSTRACT

A method and system provide a fitting system for a flexible fuel cell of an aircraft. The fitting system may include a flexible fuel cell and a fitting. The fitting may have a peripheral flange with a series of slots spaced about the flange. A series of fabric strips may be threaded into the slots of the fitting and one or more adhesives may couple the fabric strips to the fuel cell. The fabric strips may extend out around the periphery of the fitting to provide a uniform contact surface area with the fuel cell. The fabric strips may be separated by fuel cell material. The fabric strips may be made from one or more materials for enclosing or holding fuel. The fitting may further include threaded holes wherein the threaded holes may receive fasteners to couple the fitting to the fuel equipment of an aircraft.

20 Claims, 10 Drawing Sheets

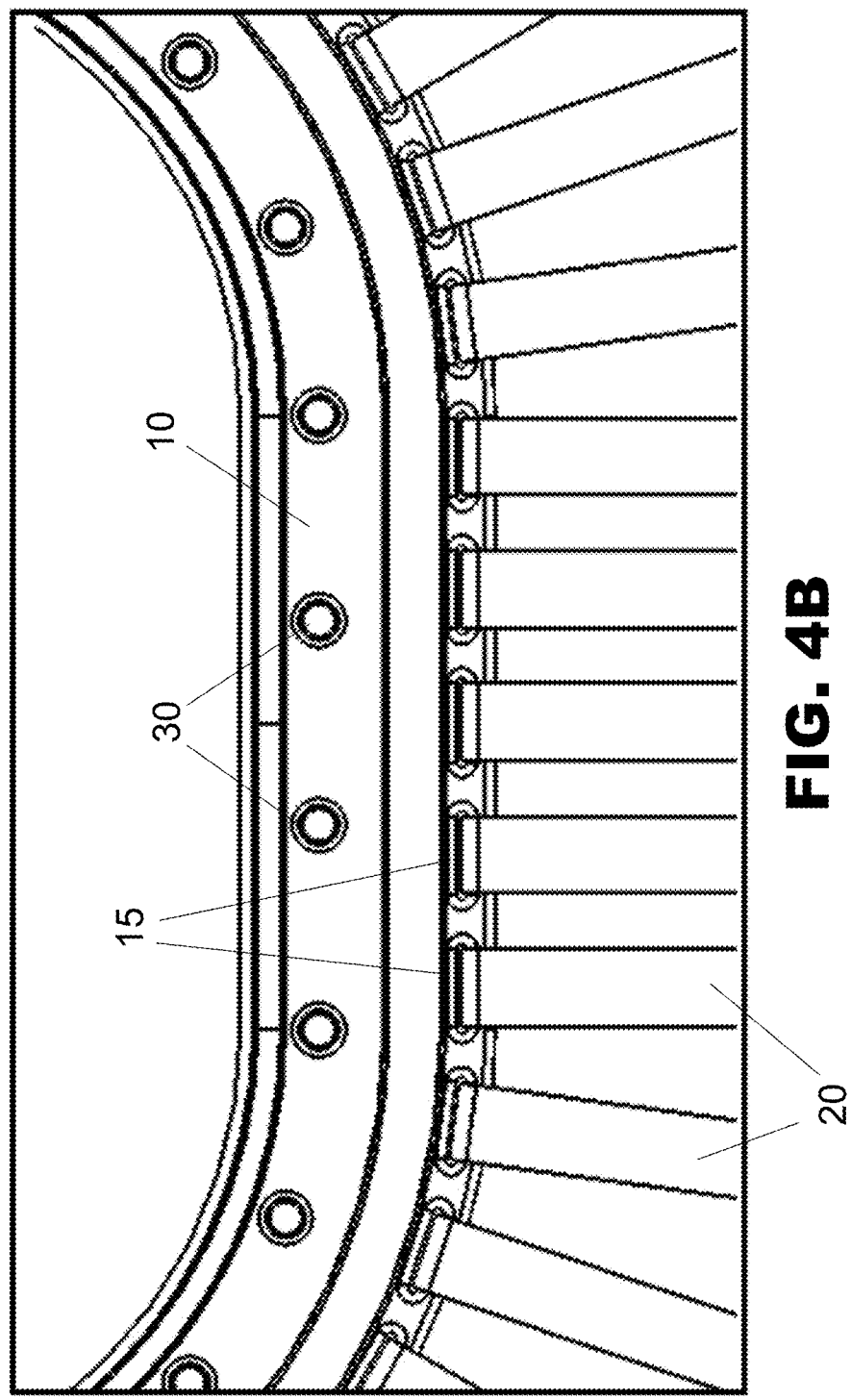

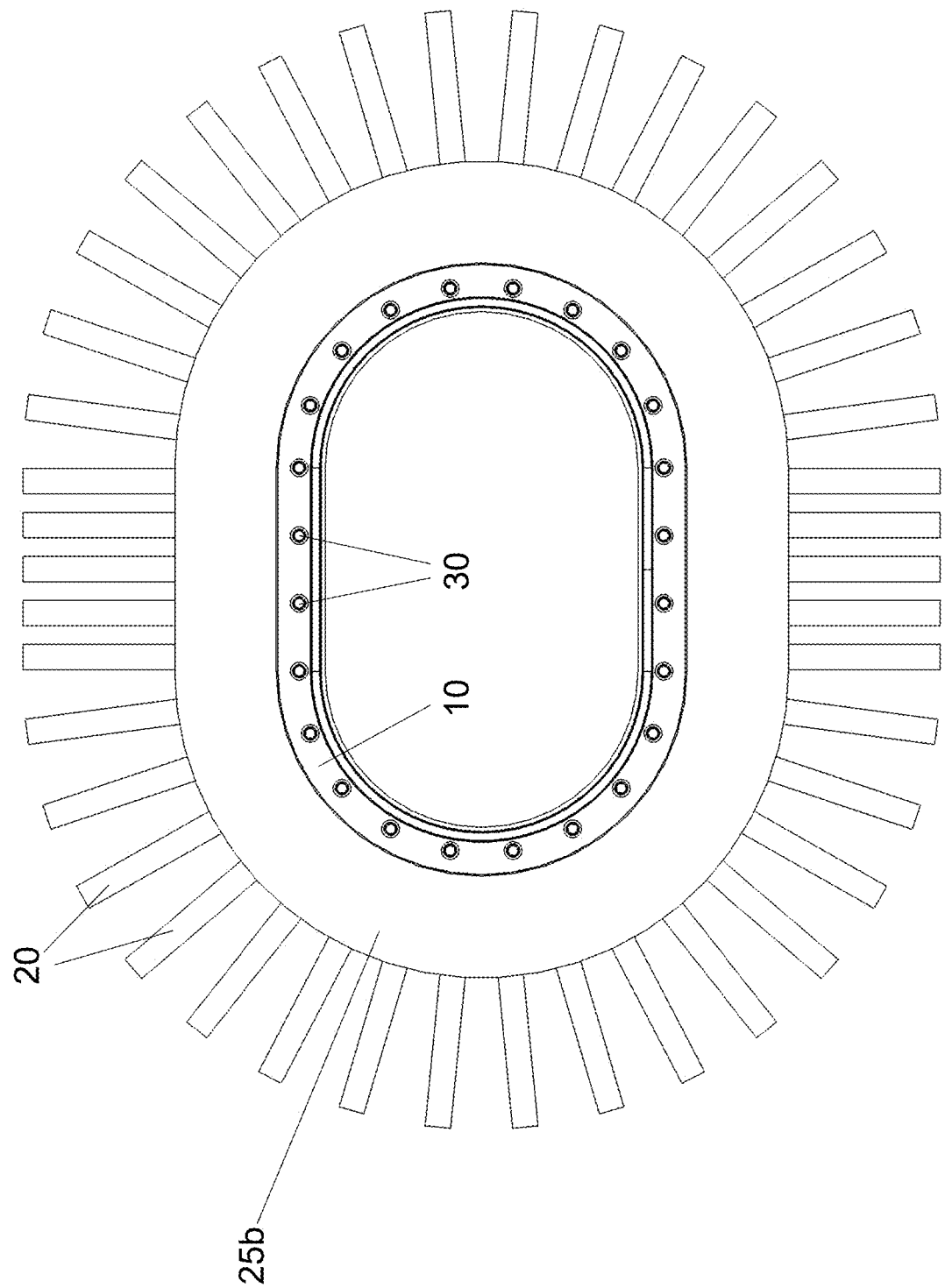

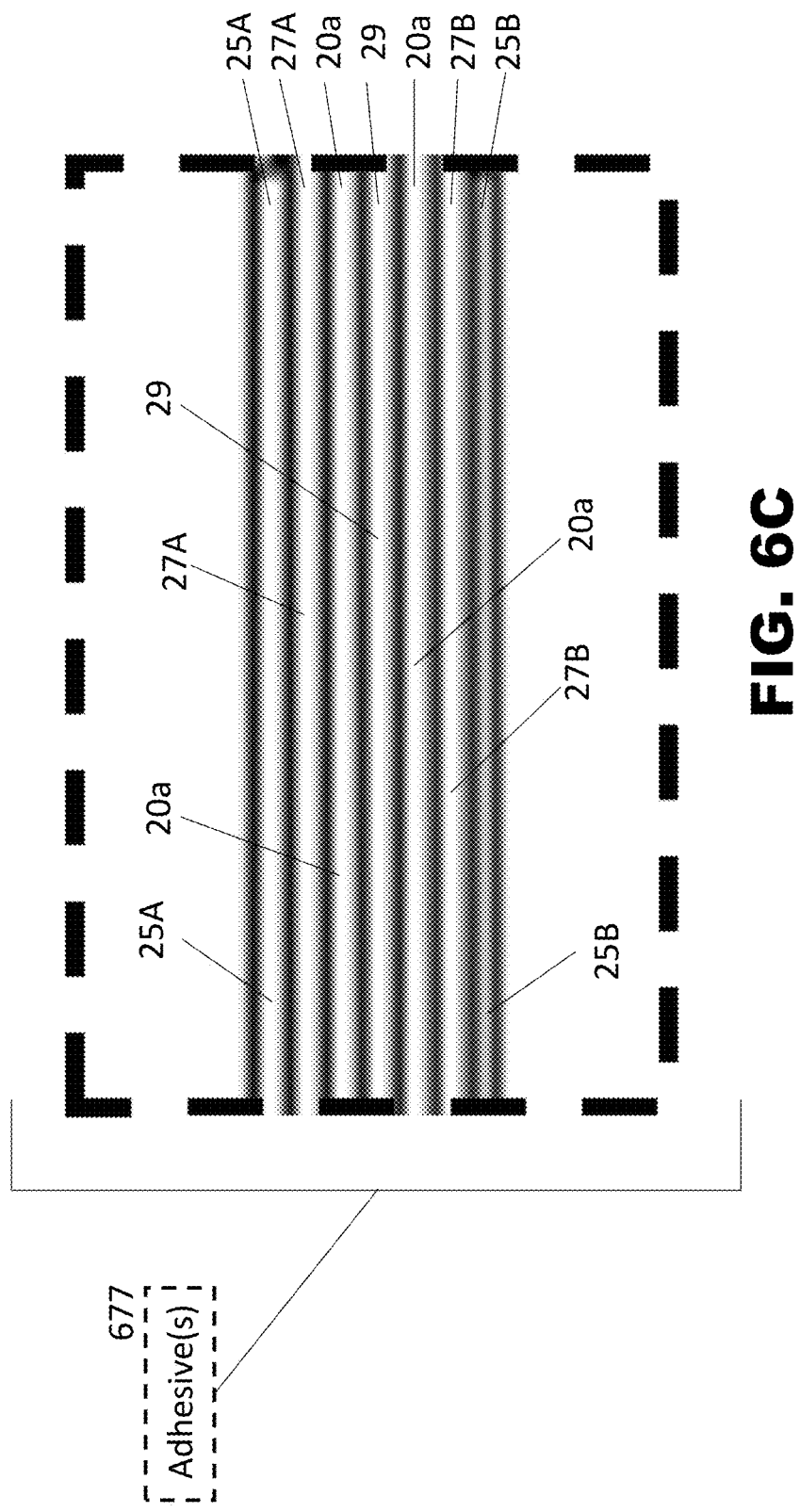

METHOD AND SYSTEM FOR PROVIDING AN IMPROVED FITTING FOR A FLEXIBLE FUEL CELL

BACKGROUND

A fitting is an opening in a flexible fuel cell volume to which attachments such as connectors, gauges, pumps, conduits and the like are mounted and which is integrated into to a flexible fuel cell volume in such a way that it provides rigidity for the attachments and flexibility for the self-sealing volume while at the same time providing suitable load support in the event of a severe impact and a fluid tight seal for liquids such as fuel.

Historically, there have been two common methods and designs of fittings used in flexible fuel cell volumes. One conventional method is a rigid metallic ring that is firmly anchored into the wall of the flexible wall container by the use of a series of arranged nylon fiber bundles.

This first approach is particularly useful since the fiber bundles transfer the loads sustained in a crash sufficiently to mitigate rupture of the self-sealing volume at the fitting. The second conventional method utilizes two metallic rings, an upper and a lower that encapsulate the flexible wall construction and transfer loads to the fuel cell radially from the interface.

The rings are pressed fit and capture the fuel cell material. Rubber cement is also applied to the rings to assist in bonding and sealing the joints providing a leak free interface.

These fittings, while used rather extensively, have their drawbacks. For fittings that incorporate a series of nylon fiber bundles around the periphery of the fitting, the number of fiber bundles required to suitable transfer the loads into the flexible fuel cell wall can be quite high. Fittings can also be large and multi-plane, which dictate a largely manual and thus time consuming process of assembly.

The nylon fibers within the bundles can also vary in diameter and quantity depending on the loads required to retain the fitting within the flexible fuel cell wall. This can result in raised areas around the periphery of the fitting at each bundle location, both on the interior and exterior of the flexible fuel cell. These raised areas can interfere with the faying surfaces of the fittings, reduce usable fuel of the flexible fuel cell and can be subjected to wear, possibly leading to leakage.

Pressed fit fittings, while easier to manufacture and assemble also have their drawbacks. Since these fittings encapsulate the flexible fuel cell material within two metallic rings, faying surfaces stick proud of the fuel cell surfaces. This reduces usable fuel volume and can increase unusable fuel. These fittings are also prone to leakage.

Flexible fuel cells for aircraft are typically folded and reduced in size in order to fit through openings much smaller than the fuel cell would be in its normal configuration. This folding of fuel cells for aircraft, either during installation or removal of fuel cells from the cavity, creates stresses on the pressed fit, bonded interface and can create leak paths for fluid to escape.

An improved single piece fitting is thus needed that provides for a more compact and consistent interface between the metallic fitting and surrounding flexible fuel cell wall that simplifies fuel cell manufacturing for aircrafts while uniformly distributing loads during flight or crash situations and maintaining a fluid tight seal.

SUMMARY

One object of this invention is to provide a single piece fitting that is thin and light in weight. Another object of this invention is to provide for a slotted perimeter around the fitting to support integrating the fittings into flexible fuel cell constructions.

Another object of this invention is to utilize strips of fuel cell material or flat webbing to distribute the loads from the fitting throughout the fuel cell. Another object of this invention is to utilize elastomeric collars on the inner and outer sides of the fitting to provide a fluid tight seal and provide adequate elongation during installation, removal and use to maintain this seal throughout the life of the flexible fuel cell.

The method and system of this disclosure provide a fitting system for a flexible fuel cell of an aircraft. The fitting system may comprise a flexible fuel cell and a fitting. The fitting may have a peripheral flange with a series of slots spaced about the flange. A series of fabric strips may be threaded into the slots of the fitting and one or more adhesives may couple the fabric strips to the fuel cell.

The fabric strips may extend out around the periphery of the fitting to provide a uniform contact surface area with the fuel cell. The fabric strips may be separated by fuel cell material. The fabric strips may be comprised of materials for containing and/or enclosing fuel. The fitting may further comprise threaded holes wherein the threaded holes may receive fasteners to couple the fitting to a fuel line of an aircraft.

With the method and system, a metal fitting may be integrated into a flexible fuel cell construction with fabric strips that may form a webbing. This is achieved by looping the strips through slots in the fitting. Adjustment in width of the slots around a periphery or circumference of the fitting may allow for improved (i.e. substantially reduced) manufacturing time without loss in integration strength.

In the prior art and conventional art, uncured rubberized fabric is often used for the strips and the fuel cell construction, and such prior art and conventional construction requires additional adhesives which add to the weight of the fuel cell, and hence, adding to the weight of the overall aircraft. With the method and system, bonding of the fabric strips and coupling of the strips to the fitting may be achieved without the need for additional adhesives, thus saving weight for the fuel cell and ultimately saving on weight for the aircraft.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

FIG. 4B illustrates an enlarged view of the region highlighted with a rectangle shown in FIG. 4A;

FIG. 5 illustrates a top view of a slotted metal fitting with elastomer collar and fabric strips around the perimeter;

FIG. 6c illustrates a magnified view of the layers illustrated in FIG. 6b; and

DETAILED DESCRIPTION

Figure 1:
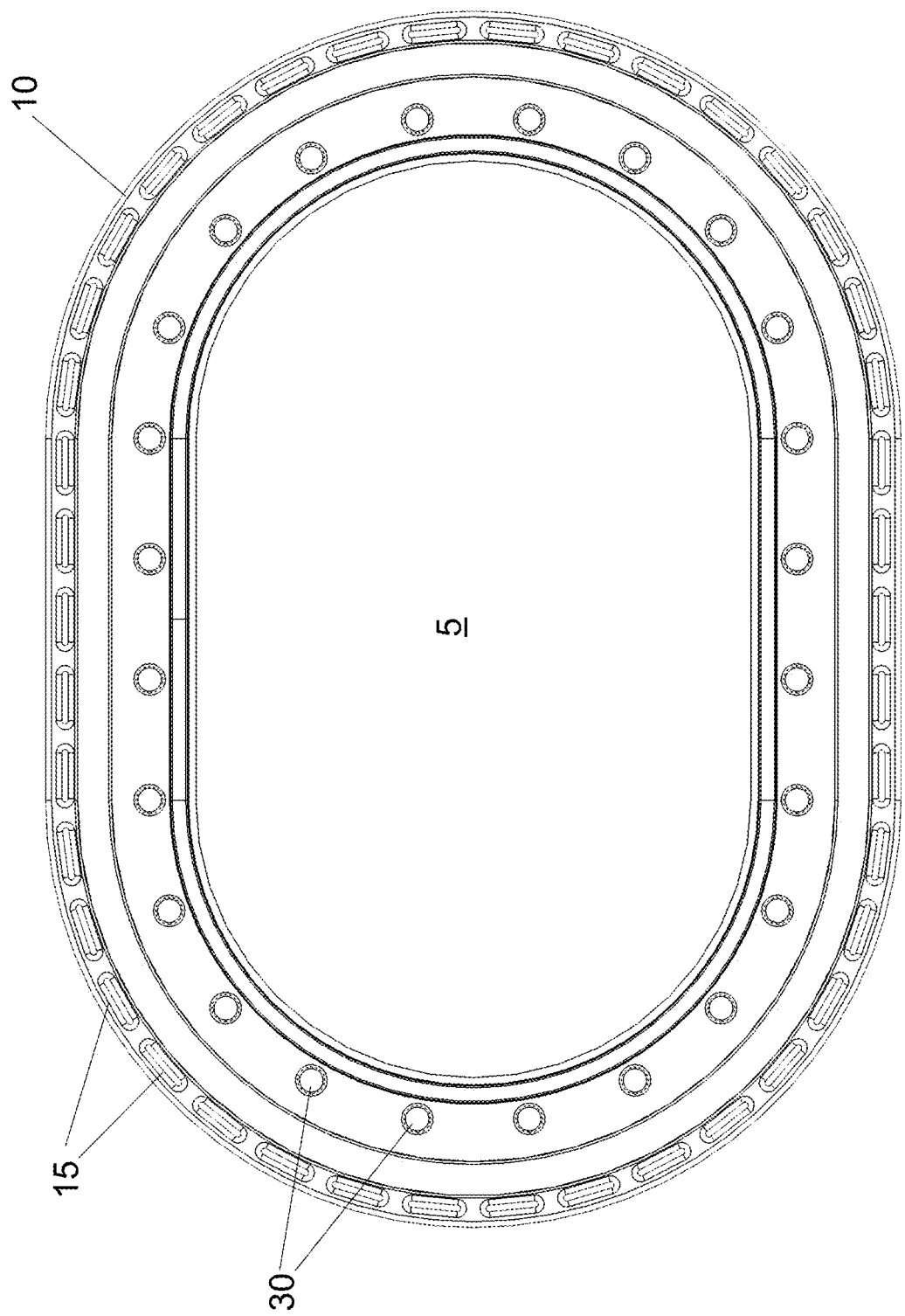
FIG. 1 illustrates a top view of a slotted metal fitting according to one exemplary embodiment of the inventive system and method.

Referring now to FIG. 1, this figure illustrates the top view of a slotted metal fitting 10. The fitting 10 is a single piece design that can be cast or machined using lightweight material (aluminum, titanium, and/or a composite). The fitting 10 has an open space or opening 5 that may receive the opening or hollow space of a structure such as a fuel equipment 699 (not illustrated in FIG. 1 but see FIG. 6a). Fuel from a fuel line would flow through opening 5 in order to fill a fuel cell 29 (See FIG. 6a) that the slotted fitting 10 may be coupled to.

Slots 15 and threaded holes 30 are visible in FIG. 1. The threaded holes 30 aid in attaching fuel cell fittings (i.e. fuel lines, fuel hoses, etc.) to an aircraft structure or access plates to keep fluid within the volume. The slots 15 provide a means of attachment to integrate the fitting into a flexible fuel cell construction 29 (See FIG. 6a for fuel cell).

Figure 2:
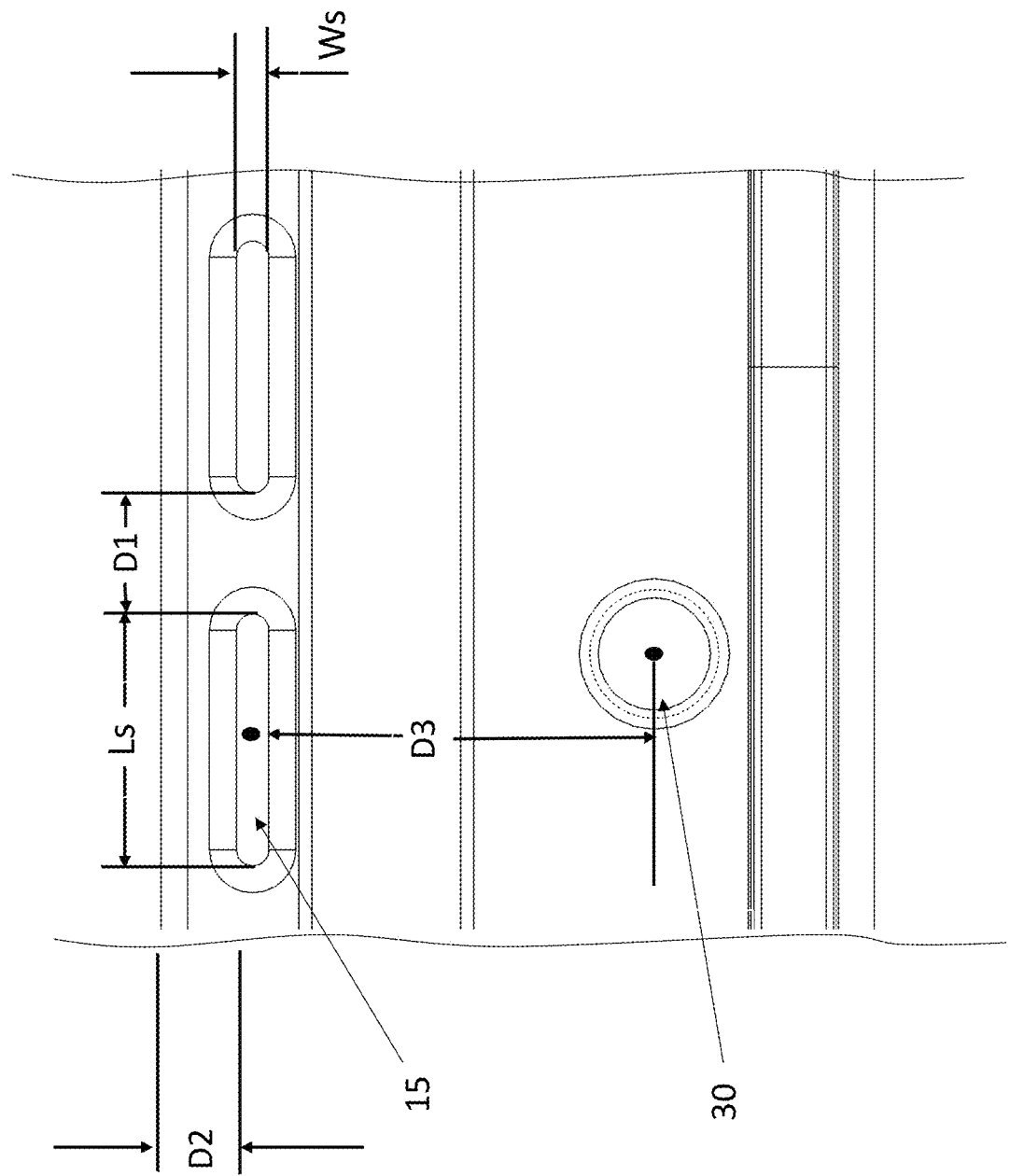
FIG. 2 illustrates a close up view of the slot.

FIG. 2 is a close up view of a slot 15. Slot size and is not limited in by those shown in FIG. 2. In order to achieve manufacturing efficiencies, slot lengths (Ls) smaller than 0.50 inches are not practical but lengths Ls can be increased to take advantage of fitting geometry and can vary within the same fitting 10. Slots 15 on straight sections could be 1.0 inch or greater which reduces manufacturing time.

In other words, slots 15 can be provided with varying dimensions/sizes along the fitting 10 where slots 15 along straight sections may have a first length Ls1, and slots 15 along curved sections of the fitting 10 may have a second length Ls2, where the first length may be greater than the second length.

Slot width (Ws) only needs to be large enough to allow for assembly and therefore slightly larger than the fabric strips or flat webbing 20 (See FIGS. 3-6b). In the exemplary embodiment of FIG. 2, the slot width is about, 0.075 of an inch. However, other dimensions are possible as explained above and are within the scope of this disclosure.

The flange thickness (Ft—See FIG. 6B) that incorporates the slots 15 around the periphery of the fitting 10 is sized according to the strength required for the application. It can be thin for lightweight TSO-C80 fuel cells and thicker for fuel cells built in accordance with U.S. Military Standard, MIL-DTL-27422.

A thin dimension for Ft would be about 0.125" of an inch; a thick dimension for Ft would be about 0.25" of an inch. Other dimensions are possible and are included within the scope of this disclosure.

Distance between slots 15 and away from the outer fitting perimeter can also vary according to the strength required. In the exemplary embodiment of FIG. 2, they may be spaced at a distance D1 of about 0.156 of an inch apart and are at a distance D2 of about 0.212 of an inch from the outer fitting perimeter. However, other dimensions are possible and are included within the scope of this disclosure.

The slots 15 may be spaced from the threaded holes by a distance D3 which may comprise about 1.145" inches. However, fittings can be utilized without an opening 5 in FIG. 1 or threaded holes based on the application.

Figure 3:
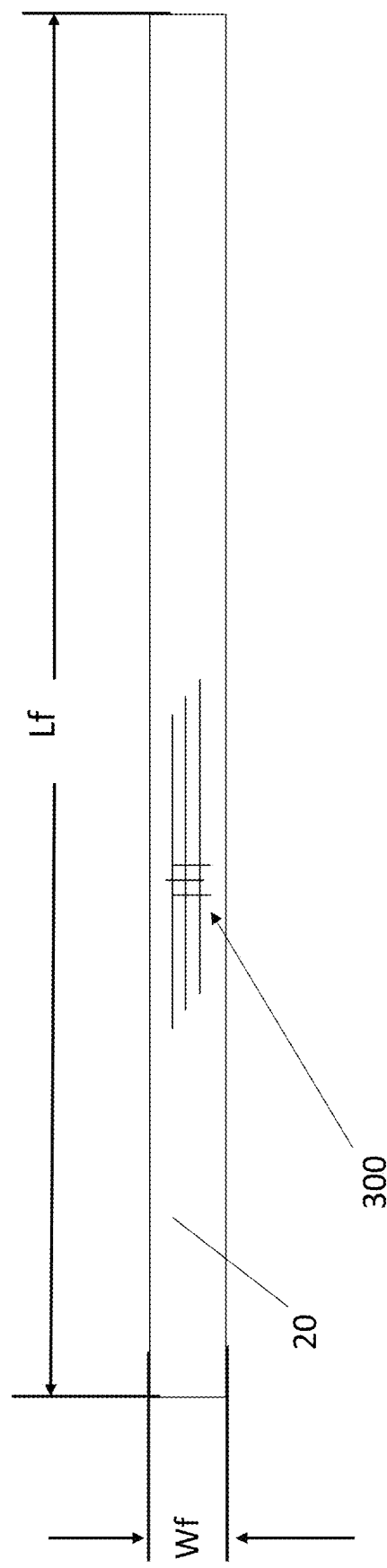
FIG. 3 illustrates the top view of an exemplary fabric strip.

FIG. 3 is a top view of a fabric strip 20. The fabric strips 20 can be of any fiber material. Exemplary materials include, but are not limited to, nylon, polyester, aramid, anisotropic polyester, polypropylene, polyethylene, and cotton, just to name a few. Fabric strips 20 are cut from the flexible fuel cell fabric material which allows for bond optimization due to similar materials.

The fabric strips 20 may be made by weaving materials and they may comprise a weave pattern 300 as illustrated in FIG. 3.

In order to achieve maximum strength, these strips 20 are cut in the 0/90 orientation that the fabric was woven. Strip width and length can vary to maximize manufacturing efficiencies and increase integration strength respectively. For practical purposes, fabric strips 20 have a width Wf of about 0.5 an inch wide, and a length Lf of about 8.0 inches and a thickness of about 0.045" of an inch thick.

As the fabric strips 20 are usually made from the fuel cell material, denier of the fibers can also vary. Exemplary denier values include, but are not limited to, between about 840 to about 1050. Flat webbing 20 could also be used in place of fabric strips 20 of fuel cell material. The flat webbing 20 can be of any fiber material. Exemplary flat webbing materials include, but are not limited to, nylon, polyester, aramid, anisotropic polyester, polypropylene, polyethylene, and cotton just to name a few.

Figure 4A:
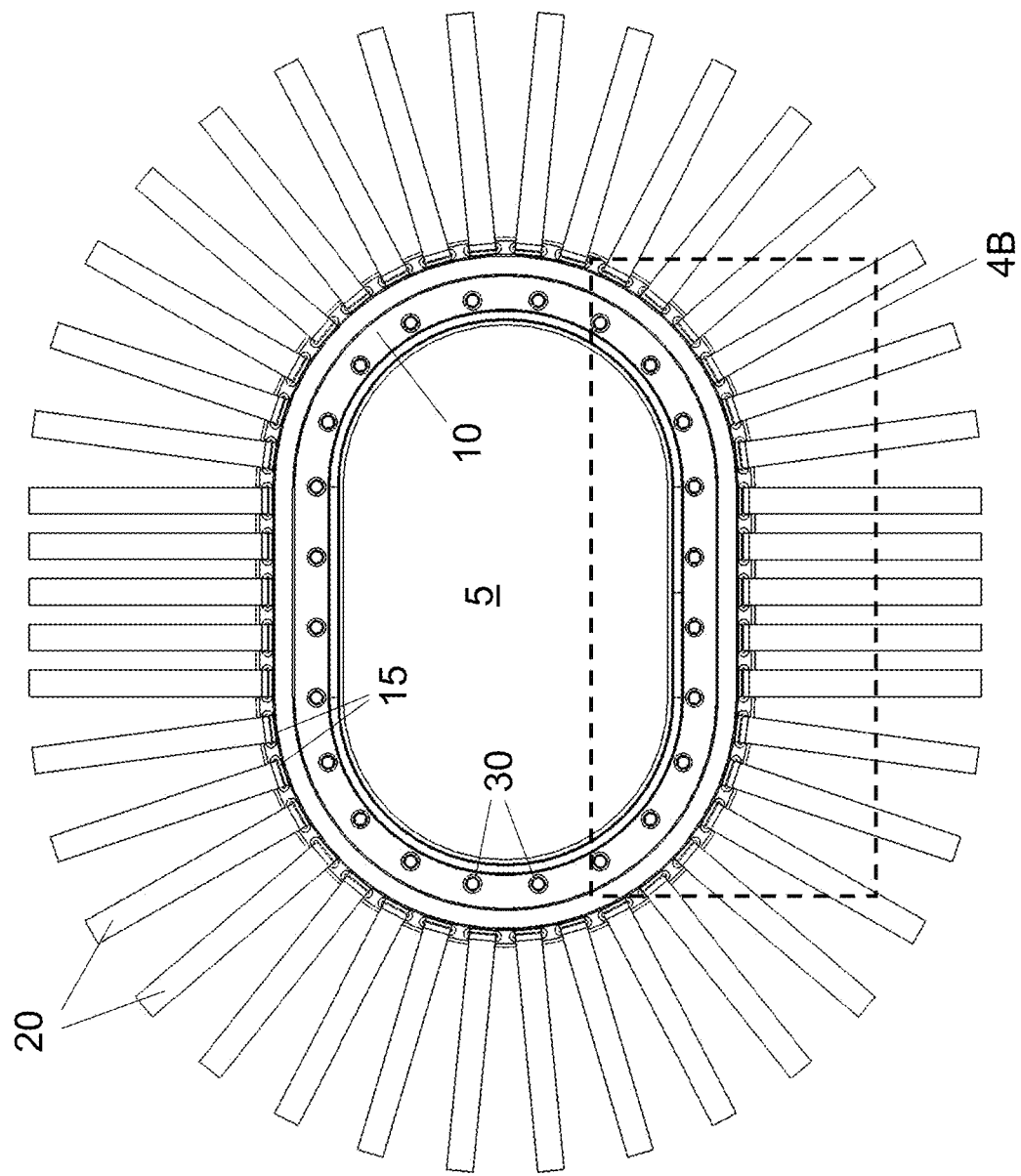
FIG. 4A illustrates the top view of a slotted metal fitting without the elastomer collar with fabric strips around the perimeter.

FIG. 4A is a top view of a slotted fitting assembly without the elastomeric collar bonded to the fitting. Individual narrow fabric webbing sections 20 are inserted through slots 15 in the periphery of the fitting in such a fashion as to provide upper and lower fabric webbing 20 that extends equidistant from the flange. The flange contains slots 15 for the narrow fabric segments 20 to feed through.

The fabric webbing 20 is "looped through" the slots 15 meaning there is one loop or "U"-shaped section 67 that enters and penetrates through each slot 15, where the loop or "U" shaped section 67 is more visible in FIG. 6B described in more detail below. Half of the webbing 20 is on one side of the slot 15 and the other half is below the same webbing and thus forming the U-shape 67 shown in FIG. 6B.

Referring back to FIG. 4B, this figure is an enlarged view of the region highlighted with a rectangle shown in FIG. 4A. FIG. 4B illustrates the details of how the fabric strips/webbing 20 may penetrate each slot 15. Each of the strips/webbing 20 extend in a radial direction relative to elliptical shape formed by the structure of the fitting 10.

Referring now to FIG. 5, this figure is a top view of a slotted metal fitting 10 with elastomer collar 25 and fabric strips 20 around the perimeter. Upper and lower elastomeric collars 25A, 25B (see lower elastomeric collar 25B in FIG. 6a) are affixed by applying elastomeric material to the top and bottom peripheries of the metal fitting 10 and to the inside edges of upper and lower elastomeric collars 25A, 25B. The outer collars 25A, 25B are adhered to the metal fitting top and bottom. Fabric strips 20 are loosely installed around the fitting 10 following installation of the elastomeric collars 25A, 25B.

The collars 25A, 25B cover the slots 15 that contain the U-shape sections 67 of the fabric strips. However, the collars 25A, 25B are generally installed around the fitting 10 so that they doe not cover the threaded holes 30. The outer collars 25A, 25B provide an additional measure of elongation during a catastrophic event to prevent rupture at the metal fitting and ensure a leak proof interface.

Elastomeric collars 25A, 25B may be fabricated out of uncured fuel resistant sheet material or over molded. Both inner and outer collars extend 25A, 25B equidistant from the metal fitting periphery. The narrow fabric webbing 20 extends radially beyond the collars 25A, 25B.

Figure 6A:
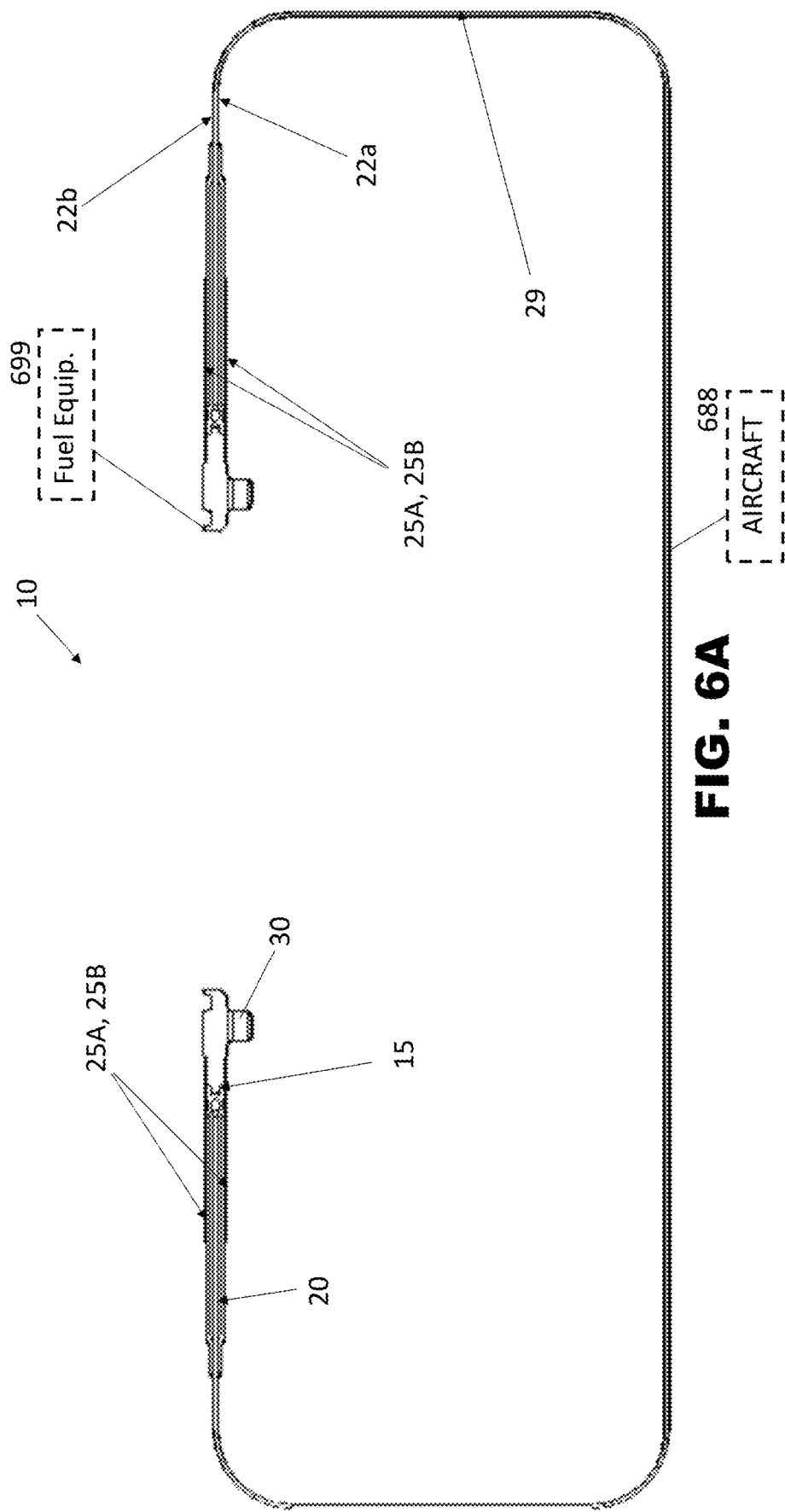
FIG. 6a illustrates a cross-section of a metal fitting integrated into a fuel cell construction.

Referring now to FIG. 6a, this figure illustrates a cross-sectional view that shows the metal fitting 10 and the fuel cell construction 29. The fuel cell/construction 29 may comprise an inner liner 22a and an outer liner 22b. The fabric strips 20 are not bonded to inner/outer liner 22a, 22b but are encapsulated under the inner liner 22a and outliner 22b as well as fabric collars illustrated in FIG. 6a.

The fuel cell construction 29 may be coupled to an aircraft 688. The aircraft 688 has been represented with a drawing symbol or a labeled representation (e.g., a labeled rectangular box) 688 to demonstrate that the fuel cell construction 29 may be incorporated in any type of aircraft 688.

Aircraft 688 may include, but is not limited to, airplanes, helicopters, hover crafts, drones, and/or i.e. any type of flying machine where weight and/or lift relative to earth/ ground is a significant design parameter/variable. Similarly, the fitting 10 may also couple to any type of fuel equipment 699.

Fuel equipment 699 has been represented with a drawing symbol or a labeled representation (e.g., a labeled rectangular box) 699 to demonstrate that any type of fuel equipment 699 may be coupled to the fitting 10 without departing from the scope and spirit of this disclosure as understood by one of ordinary skill in the art. Fuel equipment 699 may include, but is not limited to, quantity gauges, breakaway valves, vent valves, and/or access plates.

Typically, the threaded holes 30 may be used to attach the fitting 10 to fuel equipment 699. If access plates 699 are used with the threaded holes 30, these plates 699 may also attach to fuel supply or return lines. Lastly, if there are no threaded holes 30 or opening 5 in the fitting 10, a fitting 10 without an opening 5 could be used to as an additional attachment/ structure to an airframe of an aircraft or to attach internal components within an aircraft.

Figure 6B:
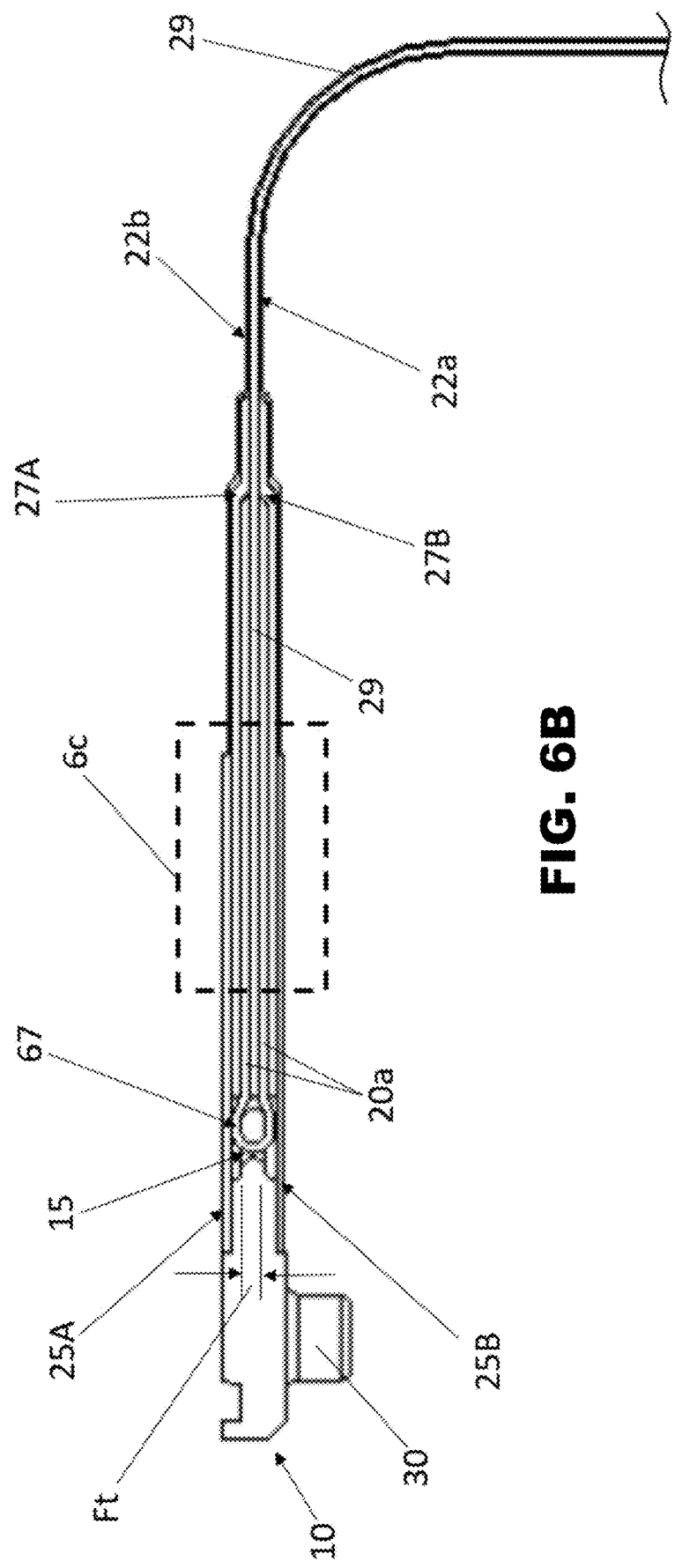
FIG. 6b illustrates a close-up view of FIG. 6a showing the fitting integration capturing the fitting and fuel cell construction.

FIG. 6b illustrates a cross-sectional view of a slotted metal fitting 10 integrated into a flexible fuel cell construction 29. The fabric strips 20 are bonded to each side of the fuel cell construction 29. To further improve the strength of the fitting integration, fabric collars 20c, 20d in addition to the elastomeric collars 25A, 25B are placed on the outside of each layer of the fabric strips 20.

Bonding can be achieved through the use of glues and cements consistent with what is used to manufacture the fuel cell. Bonding can also be achieved through adhering uncured rubberized fabrics of the strips and fuel cell construction together to form a joint in which no additional glues or cements are required.

The elastomeric collars 25A, 25B bond to the fabric collars 27A, 27B and seal off the fitting from leakage. Inner and outer liners 22a, 22b encapsulate the fuel cell construction 29 and complete the leak free construction.

Referring now to FIG. 6c, this figure illustrates a magnified view of the layers illustrated in FIG. 6b. There are a total of seven layers 25A, 27A, 20a, 29, 20a (i.e. —a second 20a layer), 270, and 25B shown in this figure.

Layers 25A, 25B may comprise the elastomeric collars discussed previously. Layers 27A, 27B comprise the fabric collars. Layers 20a, 20a comprise fabric strips 20, where strip 20 is "looped" through a slot 15 (see FIG. 6b). Layer 29 is the base fabric forming the fuel cell construction.

One or more adhesives 677 have been represented with a drawing symbol or a labeled representation (e.g., a labeled rectangular box) 677 to demonstrate that one or more adhesives 677 may be provided between each of the layers illustrated in FIG. 6c. Exemplary adhesives 677 include, but are not limited to 3M 847, sold as of this writing by 3M of Minnesota, or Dispercoll™ U 42, sold as of this writing by Covestro, LLC of Pennsylvania.

According to one exemplary embodiment, and described below in connection with Steps 610 and 615 of FIG. 6D, one or more adhesive 677 may be provided among layers collars 25A, 25B and loose fit fabric strips 20a and inner liner 22. Similarly, the inner fabric collar 27B may be applied to the inner liner 22a and elastomeric collar 25B of the pre-assembled fitting 10 using one or more adhesives 677.

It is noted that an adhesive 677 is usually not needed to be applied directly to the metal fitting 10 having its slots 15. Adhesives 677 are typically not needed for the fitting 10 itself relative to the fuel cell construction 29 since it is the fabric strips 20 that loop through the slots 15 which allow the metal fitting 10 to be integrated with/coupled to the fuel cell construction 29.

Figure 6D:
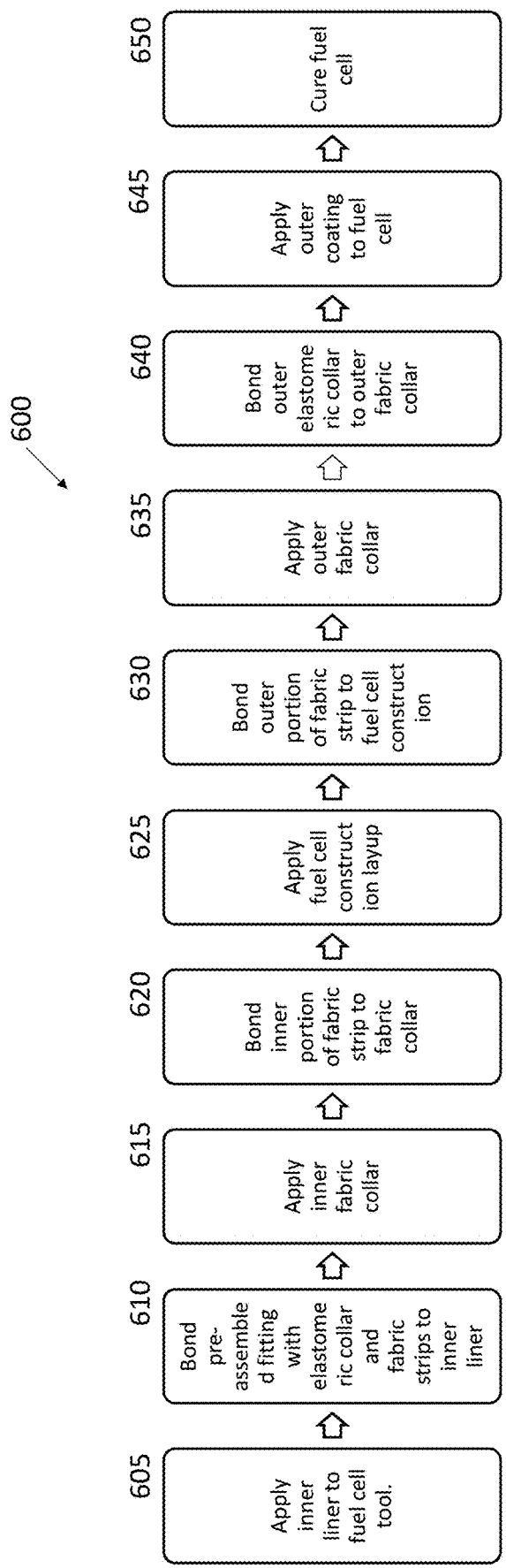
FIG. 6d is an exemplary flow chart of a method for creating a fitting for a flexible fuel cell as described and illustrated in FIGS. 1-6b.

Referring now to FIG. 6d, this figure is an exemplary flow chart of a method 600 for integrating a fitting into a flexible fuel cell as described and illustrated in FIGS. 1-6c. Step 605 of FIG. 6d is the first step of the method 600.

In step 605, an inner liner 22a is applied to a fuel cell tool. Next, in step 610, the pre-assembled fitting 10, which includes the bonded elastomeric collars 25A, 25B and loose fit fabric strips 20a, is bonded with an adhesive 677 to the inner liner 22a by means of the bottom elastomeric collar 25B. Next, in step 615, an inner fabric collar 27B is applied to the inner liner 22a and elastomeric collar 25B of the pre-assembled fitting 10 using one or more adhesives.

Subsequently, in step 620, an inner portion of the fabric strips 20 are bonded to the fabric collar 27B. Next, in step 625, a fuel cell construction layup layer 29 is applied. The fuel cell construction layup/layer 29 can be a single fabric layer, multiple fabric layers or a combination of fabric layers and self-sealing materials known to one of ordinary skill in the art that are needed to meet desired fuel cell performance Then in step 630, an outer portion of the fabric strip(s) 20 are bonded to the fuel cell construction 29. Next, in Step 635, the outer fabric collar 27A of FIGS. 6a-6b is applied to the fabric strips 20 and fuel cell construction 29 surrounding the fitting 10.

Subsequently, in step 640, the outer elastomer collar 25A is the bonded to the outer fabric collar 27A and an outer coating is then applied to the fuel cell 29. And then in step 650, the fuel cell 29 is cured.

The word "exemplary" is used herein to mean "serving as an example, instance, or illustration." Any aspect described herein as "exemplary" is not necessarily to be construed as exclusive, preferred or advantageous over other aspects.

As specific examples, the materials for the parts illustrated in the several figures may be made of metal, such as aluminum or steel. Other metals may be employed without departing from the scope of this disclosure. Other metals include, but are not limited to, bronze, copper, tin, lead, and alloys/combinations thereof.

Further, other materials besides metals are also possible and are included within the scope of this disclosure. Other materials besides metals include, but are not limited to, polymers (i.e. plastics), ceramics, composite materials, and any combination thereof.

Typically the fittings 10 described above are machined from aluminum. All other materials besides the fittings 10 are typically fabrics, rubber and adhesives, as understood by one of ordinary skill in the art.

With the method and system described above and illustrated in the several figures, a metal fitting may be integrated into a flexible fuel cell construction with fabric strips that may form a webbing. This is achieved by looping the strips through slots in the fitting. Adjustment in width of the slots around a periphery or circumference of the fitting may also allow for improved (i.e. substantially reduced) manufacturing time without loss in integration strength.

In the prior art and conventional art, uncured rubberized fabric is often used for the strips and the fuel cell construction, and such prior art and conventional construction requires additional adhesives which add to the weight of the fuel cell, and hence, adding to the weight of the overall aircraft. With the method and system, bonding of the fabric strips and coupling of the strips to the fitting is achieved, as described above, without the need for additional adhesives, thus saving weight for the fuel cell and ultimately saving on weight for the entire aircraft.

The exemplary embodiments of the inventive method and system described above are interchangeable as understood by one of ordinary skill in the art. Various embodiments may be combined with other embodiments without departing from the scope of this disclosure. That is, one or more embodiments illustrated in the several figures may be combined together.

Further, certain steps in the processes or process flows, such as those illustrated in FIG. 6D which are enabled by the mechanical drawings in this specification, naturally precede others for the invention to function as described. However, the invention is not limited to the order of the steps described if such order or sequence does not alter the functionality of the invention.

That is, it is recognized that some steps for the method 600 illustrated in FIG. 6D may performed before, after, or parallel (substantially simultaneously with) other steps without departing from the scope and spirit of the invention. In some instances, certain steps may be omitted or not performed without departing from the invention.

Although a few embodiments have been described in detail above and illustrated in the several figures, those skilled in the art will readily appreciate that many modifications from those which were described and as illustrated are possible in the exemplary embodiments without materially departing from this disclosure.

Accordingly, such modifications are intended to be included within the scope of this disclosure as defined in the following claims. For example, while several walls are illustrated for the junction box, it is possible that these walls be replaced/substituted by additional and/or fewer structures.

Further, mechanical equivalents of any of the illustrated structures could be substituted for many of the structures illustrated in the several views as understood by one of ordinary skill in the art. Such substitutions of mechanical equivalent structures are included within the scope of this disclosure.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

It is the express intention of the applicant not to invoke 35 U.S.C. § 112, sixth paragraph for any limitations of any of the claims herein, except for those in which the claim expressly uses the words 'means for' together with an associated function.

Therefore, although selected aspects have been illustrated and described in detail, it will be understood that various substitutions and alterations may be made therein without departing from the spirit and scope of the present invention, as defined by the following claims.

What is claimed is:

1. A fitting system for a flexible fuel cell of an aircraft comprising:
   a flexible fuel cell;
   a fitting with a peripheral flange having a series of slots spaced about the flange;
   a series of fabric strips threaded into the slots of the fitting; and
   one or more adhesives that couple the fabric strips to the fuel cell.

2. The system according to claim 1, wherein the fabric strips extend out around a periphery of the fitting to provide a uniform contact surface area with the fuel cell.

3. The system according to claim 1, wherein the fabric strips are separated by fuel cell material.

4. The system according to claim 1, wherein the fabric strips are comprised of material for enclosing or holding fuel.

5. The system according to claim 1, further comprising threaded holes.

6. The system according to claim 5, wherein the threaded holes receive fasteners to couple the fitting to fuel equipment.

7. The system according to claim 6, wherein the fuel equipment comprises at least one of a gauge, a breakaway valve, a vent valve, and an access plate.

8. The system according to claim 1, wherein the fuel cell is coupled to the aircraft, the aircraft comprising at least one of an airplane, helicopter, a hover craft, and a drone.

9. The system according to claim 1, wherein the fitting is made out of a metal.

10. The system of claim 1, wherein the slots have an elliptical shape.

11. A fitting system for a flexible fuel cell of an aircraft comprising:
    a fitting with a peripheral flange having a series of slots spaced about the flange;
    a series of fabric strips threaded into the slots of the fitting; and
    a series of holes spaced at a distance from the flange and the slots and positioned closer to a geometrical center of the fitting compared to the flange and slots.

12. The system of claim 11, further comprising a flexible fuel cell, the fitting being coupled to the flexible fuel cell.

13. The system according to claim 12, wherein the fabric strips extend out around a periphery of the fitting to provide a uniform contact surface area with the fuel cell.

14. The system according to claim 13, wherein the fabric strips are separated by fuel cell material.

15. The system according to claim 11, wherein the fabric strips are comprised of material for enclosing or holding fuel.

16. The system according to claim 1, wherein the holes further comprise threads.

17. The system according to claim 16, wherein the threads receive fasteners to couple the fitting to fuel equipment.

18. The system according to claim 17, wherein the fuel equipment comprises at least one of a gauge, a breakaway valve, a vent valve, and an access plate.

19. The system according to claim 12, wherein the fuel cell is coupled to the aircraft, the aircraft comprising at least one of an airplane, helicopter, a hover craft, and a drone.

20. The system according to claim 11, wherein the fitting is made out of a metal.

\* \* \* \* \*